(12) United States Patent
Kulkarni et al.

(10) Patent No.: US 6,977,285 B2
(45) Date of Patent: Dec. 20, 2005

(54) OLIGOMERS CONTAINING N-ACETYL GLUCOSAMINE (NAG)

(75) Inventors: Mohan Gopalkrishna Kulkarni, Maharashtra (IN); Jayant Jagannath Khandare, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/812,838

(22) Filed: Mar. 30, 2004

(65) Prior Publication Data

US 2005/0222326 A1     Oct. 6, 2005

(51) Int. Cl.[7] ............................ C08G 63/48; C08H 1/00
(52) U.S. Cl. ................. 526/238.1; 536/55.2; 536/17.2; 536/18.7; 536/22.1; 526/238.2; 526/238.22; 526/238.23; 527/312
(58) Field of Search ....................... 525/54.1; 528/224; 536/18.7, 22.1, 55.2, 17.2; 526/238.1, 238.2, 526/238.22, 238.23; 527/312

(56) References Cited

U.S. PATENT DOCUMENTS

| | | | |
|---|---|---|---|
| 4,465,827 A | | 8/1984 | Kawasaki et al. |
| 6,605,714 B2 | * | 8/2003 | Vaidya et al. ............... 536/55.2 |
| 2002/0098567 A1 | | 7/2002 | Vaidya et al. |

FOREIGN PATENT DOCUMENTS

| | | |
|---|---|---|
| GB | 1099372 | 1/1968 |
| WO | 94/14823 | 7/1994 |

OTHER PUBLICATIONS

Vaidya, et al., Termoprecipitation of Lyosome from egg ahite using copolymers of N-isopropylacrylamide and acific monomers:, May, 2001, Journal of Bioutechnology, Isue 2, V. 87, pp. 95-107.*

* cited by examiner

*Primary Examiner*—James J. Seidleck
*Assistant Examiner*—Irina S. Zemel
(74) *Attorney, Agent, or Firm*—Ladas and Parry LLP

(57) ABSTRACT

Functional polyvalent oligomer for applications in medicine and biotechnology are disclosed. These oligomers have the formula (1)

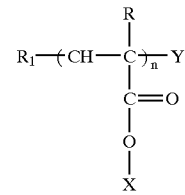

Formula (1)

wherein R is H, $CH_3$, $C_2H_5$, R1, is H, NH2, OH, COOH, X is N-Acetyl Glucosamine, mannose, galactose and sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose, Y is H, COOH, OH or NH2, and n is from 3 to 50. The present invention also relates to synthesis of such oligomeric ligands. The method of synthesis of the present invention for oligomerization can be—applied to other ligands such as sialic acid, mannose and galactose and can -be used for the prevention of infections.

13 Claims, No Drawings

OLIGOMERS CONTAINING N-ACETYL GLUCOSAMINE (NAG)

FIELD OF INVENTION

The present invention relates to oligomers containing N-Acetyl Glucosamine (NAG) and process for the preparation thereof. More particularly, the present invention relates to the oligomers of formula (1) herein below.

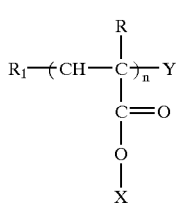

Formula (1)

wherein,
R is H, $CH_3$, $C_2H_5$ or $C_6H_5$, R 1 is H, $NH_2$, OH, COOH and X is N-Acetyl Glucosamine, mannose, galactose and sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose, Y is H, COOH, OH or NH2, and n is from 3 to 50.

These oligomers are either homopolymers or functionalized homopolymers of suitable molecular weight bearing specific terminal functional group. These oligomers may be used for preparation of block copolymers for inhibition of viral infections and the recoveries of biomolecules.

BACKGROUND OF THE INVENTION

Receptor recognition and binding of ligands are remarkable events by which the numerous interactions are being controlled in the body. Especially, carbohydrates have a central role in biological phenomena such as protein carbohydrate interactions. Despite known role of carbohydrates in biology, relatively few investigations are reported on methods of enhancing these interactions. New targets for carbohydrate such as enzymes, proteins and viruses are being identified which can have numerous applications in therapeutics. Carbohydrates play critical role in various biological processes such as cell recognition, cell adhesion, cell differentiation, inflammation, viral and bacterial infection, tumerigenesis, and metastasis (Rouhi, A. M., Chem. Engg. News, Sep. 23, 62–66, 1996).

Sharon et al., (Science 246:227–234, 1989) reported that the carbohydrate portions-of glyco-conjugate molecules to be an important entity in carbohydrate biology. Advantage of carbohydrate modification lies in that it may impart change in physical characteristics such as solubility, stability, activity, antibody recognition and susceptibility to enzyme.

Carbohydrates can be utilized as binding entity to the receptors by incorporating in the monomer. Thereby the polymerizable monomers containing ligand can be oligomerized or polymerized to form a multivalent conjugate. Multivalent ligand may include shorter oligomers having pendant functional groups that may impart specific properties to the polymer.

A recent patent granted to Krepinsky, et al. (U.S. Pat. No. 6,184,368, 2001) suggests the application of carbohydrates in preventing the infections. Mandeville, et al. (U.S. Pat. Nos. 5,891,862, 1999 and 6,187,762, 2001) reported the use of polyvalent polymers containing carbohydrates for the treatment of rotavirus infection. Monovalent ligands display weak affinities and poor specificity towards the receptor binding sites. In contrast, a saccharide in a multivalent form can bind to the same substrate with greater affinity and specificity. The binding of cell surface receptors to multivalent carbohydrate molecules exhibits wide variety of biological responses and has unique edge over monovalent interactions (Mammen, et al., Angew. Chem., IntEd., 37, 2754–2794, 1998).

Multivalent ligands of varying length and density are useful for receptor ligand interactions in biological systems. Many chemical and chemoenzymatic methods have been reported for the preparation of di- and trivalent ligands, dendrimers, and high molecular weight polymers, but involve complex synthetic methods. Thus, there is a need to devise simple methodology to obtain multivalent ligands of varying polymolecularity.

Polyvalent ligands present on pathogen bind to multiple receptors on the host cell. Oligomers or polymers comprising multiple ligands could be more effective inhibitors for the host cell receptor, as a result of higher affinity for the pathogen. In addition the higher molecular weight of the polymeric ligands also prevents the infection through steric exclusion. (Spaltenstein, A., and Whitesides, G. M., J. Aru. Chem. Soc., 113, 686, 687, 1991).

Agglutination of erythrocytes caused by influenza virus can be prevented by use of polyvalent sialic acid inhibitors. This novel approach which is a model for pathogen host interactions was reported by Mammen, M., and Whitesides, G., M., (J. Med. Chem. 38(21), 4179–90, 1995). The authors reported polymers containing sialic acid as effective inhibitors of influenza virus. Moreover, they suggested two favorable mechanisms for inhibition between the surfaces of virus and erythrocytes 1) High-affinity binding through polyvalency, and 2) Steric stabilization.

Sigel et al. (J. Am. Chern. Soc., 118(16), 3789–3800, 1996) reported the efficacy of polymers containing sialoside groups in inhibiting the adhesion of influenza virus to, erythrocytes. They delineated the contributions of enhanced substrate ligand binding and steric considerations to efficiency of inhibition. These investigators reported sialic acid ligands, which can be exploited for the inhibition of the influenza virus. Monomeric inhibitor requires a higher concentration for inhibition since they are required to occupy at least half of the sialic acid binding sites on the virus, whereas the high molecular weight inhibitors need only a few attachments to achieve the same. Dimick et al. (J. Am. Chern. Soc., 121: 44, 10286, 1999) reported the molecular cluster glycoside effects, and the synthesis of polyvalent ligands for the plant lectin concanavalin A.

Krepinsky, et al. (U.S. Pat. No. 6,184,368, 2001) reported the limitations in the productive binding of chitosan to lysozyme and methods for the synthesis of polyvalent carbohydrate molecules by glycosylation of partially protected polysaccharides bearing a single glycosylating agent or a mixture of glycosylating agents.

Roseman D., S, et al., (J., Biol., Chem., 18;276 (20): 17052–7, 2001) reported greater specificity of mannose/N-acetylgalactosamine receptor for multivalent ligands than monovalent ligands. Various methods have been reported in the past to synthesize multivalent ligands such as ring-opening metathesis polymerization (ROMP). ROMP has been used to generate well defined, biologically active polymers by Gibson et al., (Chern. Comm., 1095–1096, 1997) and Biagini et al., (Polymer, 39, 1007–1014, 1998)

Damschroder et al. (U.S. Pat. No. 2,548,520, 1951) disclosed high molecular weight materials prepared by copolymerizing proteins conjugated with unsaturated monomers or proteins conjugated with preformed polymers. Synthesis of these high molecular weight materials generally requires temperatures up to 100 0 C. Such high temperatures are not well tolerated by most of the proteins. Thus the methods described are unsuitable for producing polymers of biologically active molecules.

Jaworek, et al. (U.S. Pat. No. 3,969,287, 1976) reports a method for the preparation of carrier-bound proteins, wherein the protein is reacted with a monomer containing at least one double bond capable of copolymerization. The carrier is provided as a water insoluble solid or is produced in situ by the polymerization of water-soluble monomers in the presence of the protein monomer conjugate. The proteins utilized in the method of this invention are typically enzymes.

The carbohydrate such as NAG serve as ligands for lectins and lysozyme. Roy et al. (J. Chem. Soc. Chem. Comm., 1611–1613, 1992) reported custom designed glycopolymer synthesis by terpolymerizations. The N-acryloyl precursors and the acrylamide were used as effector molecules to provide specific properties such as hydrophobicity and mimicking tyrosine residues of proteins.

Mochalova et ai. (Antiviral Research, 23, 179–190, 1994) reported carbohydrate inhibitors like sialic acid anchored to polymeric or liposomal carriers. They conjugated glycylamido benzylsialoside with poly(acrylic acid-co-acrylamides) and dextrans. These polymeric ligands were evaluated for their ability to bind influenza A and B virus strains in cell culture.

Hansen et al., (J. Am. Chem. Soc., 119, 6974, 1997) reported the ability to inhibit the binding of the bacterium *Staphylococcus suis* to Gal a (1,4) Gal on epithelial cells of the urinary tract. And the results represent the minimum concentration of multivalent compound required to inhibit the crosslinking of red blood cells by the bacterium.

Nishimura (Macromolecules 27, 4876–4880, 1994) demonstrated that the inhibitory effect of glycosylated-cyclodextrins on the erythrocytes agglutination induced by wheat germ (*Triticum vulgaris*) agglutinin was observed at 240-fold lower concentration that its monomeric counterpart.

In an alternative approach -Kanai, et aL (J. Am. Chern. Soc., 119, 9931–9932, 1997) reported ring opening metathesis polymerization (ROMP) methods for the synthesis. However the methods are complicated and do not control "living" nature of glycopolymer.

Dimick et al. (J. Am. Chern. Soc., 121, 44, 10286, 1999) explored newer strategies for enhancing interactions. Synthesis of polyvalent ligands was reported and the role of glycosidic clusters in enhancing binding with plant lectin concanavalin A was demonstrated.

Yamada et al (Macromolecules, 32, 3553–3558, 1999) reported controlled synthesis of amphiphilic block co polymers with pendant N-Acetyl Glucosamine (NAG) residues by living cationic polymerization. Copolymer architecture resulted in an enhancement in binding between Wheat Germ Agglutinin (WGA) and NAG.

Krepinsky, et al. (U.S. Pat. No. 6,184,368) reported methods for synthesis of polyvalent carbohydrate molecule by glycosylations of partially protected polysaccharides bearing a single glycosylating agent or a mixture of glycosylating agents. The patent explains the non-productive binding of chitosan to lysozyme.

Chitosan has the Formula 4)

Formula (4)

and is linear, binary heteropolysaccharide and consists of acetaamido-2-deoxy-β-D-glucose (GlcNAc; A-unit) and 2-amino-2-deoxy-β-D glucose (GlcNAc, D-unit). The active site of lysozyme comprises subsites designated A–F. Specific binding of chitosan sequences to lysozyme begins with binding of the NAG units in the subsite C. Moreover natural ligands derived from glucose are susceptible to microbial growth. There is need to synthesize ligands similar to repeat units of chitosan which will not be hydrolyzed by lysozyme. These polymers are expected to be more stable than chitin and chitosan. Apart from the type of the ligand, its distribution along the polymer chain also plays a crucial role in influencing the efficiency of the inhibition.

Natural oligosaccharides usually bind to their host molecules weakly and they must be used in larger quantities for an effective treatment. This problem can be overcome by synthesizing polyvalent carbohydrate conjugates (Zopf, D., Roth, S. Lancet 347, 1017, 1996) since such molecules bind the target molecules through multiple contacts and result in strong binding and also benefit from steric contribution arising out of their macromolecular nature.

Polyvalent molecules occupy the carbohydrate binding site competitively and the process of infection is thus interrupted. The polyvalent oligosaccharide molecule has a further advantage in that it can bind to particular pathogenic bacterium without any prior knowledge of exact binding requirements of the particular microorganism.

The design of multivalent ligands containing sialic acid is reported recently by Whitesides et al., (Angew. Chem. Int. Edn., 37, 2754–2794, 1998) for the treatment of infectious diseases such as rotavirus and influenza virus. This concept is justified on the basis of inhibition of virus adhesion to the host cells. The approach is therapeutically important because of increased pathogen resistance to antibiotics and drugs.

Oligosaccharide moieties, which bind to cellular proteins with higher specificity has a greater conformational flexibility. Various strategies have been suggested in the past to enhance the interactions.

Nishimora et al, (Tetrahedron 56, 9909, 2000) synthesized clustering, sugar homopolymers from Acrylamidoalkyl glycosides of N-Acetyl-D-Glucosamine. On addition of the cluster type polymer, binding to Wheat Germ Agglutinin was enhanced. Controlled synthesis of amphiphilic block copolymers bearing pend.ent N-Acetyl-D Glucosamine residues by living cationic polymerization and the interaction of the resulting diblock copolymers with lectins was reported by Yamada et al. (Macromolecules, 32, 3553–3558, 1999). This methodology of synthesizing homopolymers and the block copolymers with N-Acetyl-D-Glucosamine residues demonstrate significant increase in binding affinity for lectin.

OBJECTS OF THE INVENTION

Therefore, it is an important object of the present invention to prepare oligomers containing N-Acetyl Glucosamine (NAG).

Another object of the present invention is to provide oligomers for application in medicine and biotechnology.

Another object of the present invention is to provide a convenient method of preparation of functional oligomers of various molecular weights ligands such as NAG, mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose. Still another object of the present invention is to provide a wide range of oligomer wherein the oligomer can be a homopolymer or a functional oligomer bearing a, terminal functional group.

Still another object of the present invention is to provide a wide range of oligomer wherein the oligomer can be poly Acryloyl NAG' or poly Methacryloyl NAG of varying molecular weights.

Still another object of the present invention is to provide functional polyvalent oligomer wherein the polymer can be poly Acryloyl NAG bearing hydroxy, amino, alcohol, carboxyl, sulphonic groups either at one end or both ends of the chain.

Still another object of the present invention is to provide a process for functional polyvalent oligomer by free radical polymerization method.

Yet another object is to provide a convenient method of preparation of polyvalent oligomers containing NAG ligands which bind more strongly vis-à-vis NAG with the substrates.

Yet another object of the present invention is to provide more stable oligomers for interactions with biomolecules than the natural polymers such as chitin and chitosan containing NAG.

Yet another object of the present invention is to provide polyvalent oligomers, which will not be hydrolyzed by an enzyme.

Still another object of the present invention is to provide polyvalent ligands, which bind with water soluble biomolecules.

Still another object of the present invention is to provide functionalized oligomers, which inhibit substrates effective at very low concentration. This is a significant advantage when the ligands under consideration are expensive e.g. sialic acid.

SUMMARY OF THE INVENTION

The present invention relates to oligomers of formula (1) herein below.

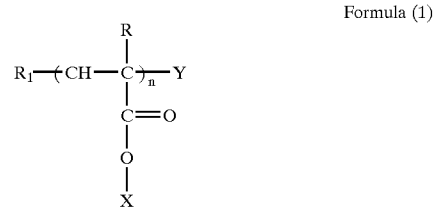

Formula (1)

wherein,

R is H, $CH_3$, $C_2H_5$ or $C_6H_5$, R 1 is H, $NH_2$, OH, COOH and X is N-Acetyl Glucosamine, mannose, galactose and sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose, Y is H, COOH, OH or NH2, and n is from 3 to 50.

More particularly it relates to the said oligomers containing carbohydrate ligands and preparation thereof. Still more particularly, it relates to oligomers, which bind more strongly to lysozyme than NAG itself. The oligomers provided are prepared by free radical polymerization technique using Acryloyl N-Acetyl Glucosamine of the Formula (2)

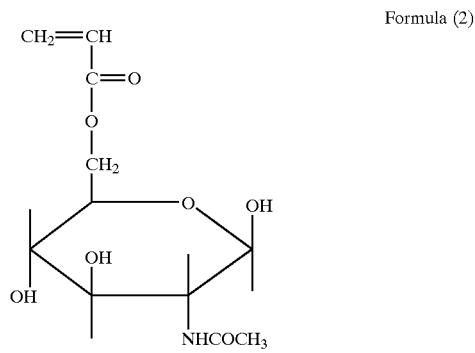

Formula (2)

and chain transfer agent such as Mercapto Ethanol (ME) having Formula 3

Formula 3

$HSCH_2CH_2OH$

The present invention provides oligomer for a biomolecular target and method for synthesis thereof, which represents selective binding to the target enzyme/protein. The present invention also provides a method for obtaining affinity ligand useful for isolating biomolecule from a solution. Further, these oligomer can be copolymerized with suitable comonomer to offer wide range of polymer architecture than those realized in the past.

Moreover oligomer ligands containing N-Acetyl Glucosamine reported here are easy to prepare and are resistant to degradation, reusable, stable and free from microbial contamination.

The present invention relates to the oligomers containing carbohydrate and preparation thereof. The oligomers can be homopolymers or bearing terminal functional groups.

DETAILED DESCRIPTION

The oligomers comprising carbohydrate may also further be used in the treatment of bacterial or viral infections, and are expected not to cause drug resistance. Oligomers containing NAG show enhanced hydrolytic stability and water solubility than natural polymers containing NAG such as chitosan and chitin. They may be also used as anti infective agents both for prevention and treatment of diseases, recovery of the naturally occurring as well as genetically manipulated biomolecules.

The approach described herein is a generic one and can be extended to other systems as well. For example sialic acid ligands are known to bind to influenza and rotavirus. Hence oligomers comprising sialic acid can be expected to bind to these viruses and others containing similar receptor sites more strongly than the corresponding monomers.

The present invention provides methods for the preparation for oligomers containing N-Acetyl Glucosamine (NAG) and optionally terminal functional group. These oligomers provide improved binding and inhibition of biomolecules. Moreover these oligomers can be linked to stimuli sensitive polymers which can be used for the biomolecule recovery. The method of preparation of oligomer can be applied to other ligands such as sialic acid galactose and mannose.

Infections are initiated by adherence of pathogens onto a host through a appropriate ligands, which have specific binding affinity to carbohydrate moieties. Since the attachment to host cells is the initial event of the infection process, competitive binding by oligosaccharides mimicking the oligosaccharide moieties of glycolipids or glycoproteins can prevent or reduce the infection (Zopf, et al., Lancet 347, 1017, 1996). Such attachment also occurs when the carbohydrate is located on the pathogen and therefore the carbohydrate mediates the binding to the host's proteins. The binding properties of oligosaccharides are biologically important which makes them suitable entities for use in human therapeutics. Particularly they can play an important role as a preventive agent in human infections.

Carbohydrates may, in addition to protection against infection, be utilized for the treatment of infectious diseases that are more difficult to treat because of growing pathogen resistance to antibiotics and drugs.

Affinities and binding constants in carbohydrate-protein interactions are weak and the dissociation constants are of the order of 10–1 millimoles. To overcome these limitations there is a need to enhance the binding between carbohydrates and corresponding multimeric proteins. The enhancement in binding due to polyvalent interactions arises from the conformational flexibility of the polyvalent ligands which enables binding with the biological receptors.

The term "oligomer" used here represents a molecule prepared from a polymerizable monomer conjugated with NAG under appropriate conditions and having a degree of polymerization less than 50. The polymerizable monomeric N-Acetyl Glucosamine such as acryloyl NAG, methacryloyl NAG, glycidyl acryloyl NAG or glycerol acrylate NAG.

A representative oligomer used here is poly Acryloyl N-Acetyl Glucosamine (P.Ac.NAG) of formula (5):

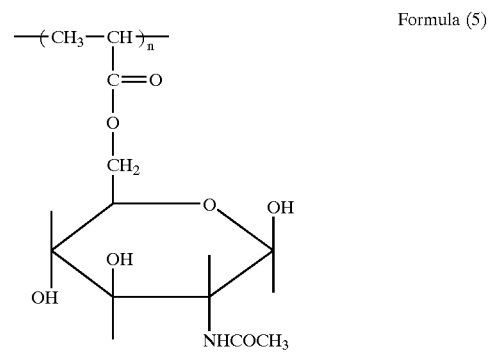

Formula (5)

A non-limiting representative oligomer with functional group here is poly Acryloyl N-acetyl Glucosamine Metcapto Ethanol (P, Ac, NAG, ME) of the Formula 6:

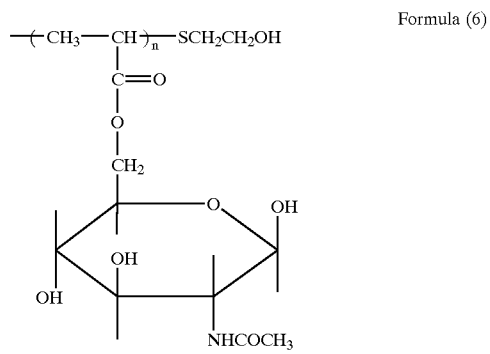

Formula (6)

NAG is derived from chitosan which is a linear, binary heteropol: "aGcharide and consists of 2-acetoamido-2-deoxy-β-D-glucose (GlcNAc; A-unit) and 2-amino 2-deoxy-β-D-glucose (GlcNAc, D-unit). Chitosan is a powerful natural ligand, which binds to lysozyme through the NAG residues. But it suffers from three major limitations: 1) Chitosan is insoluble at neutral pH, which limits many applications. 2) Chitosan undergoes the transglycosylation and mutarotation, which substantially reduces its activity and efficiency 3) Chitosan is hydrolyzed by lysozyme.

The present invention provides a simple method for the preparation of oligomers containing NAG, which can be used for the multivalent interactions.

Accordingly the present invention provides oligomers having formula (1)

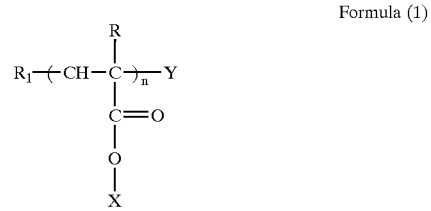

Formula (1)

wherein, R is H, $CH_3$, $C_2H_5$, $C_6H_5$, RI is H, $NH_2$, OH, COOH, X is N-Acetyl Glucosamine, mannose, galactose and sialic acid, fructose, ribulose, erYthrolose, xylulose, psicose, sorbose, tagatose, glucopyranose, fructofuranose, deoxyribose, galactosamine, sucrose, lactose, isomaltose, maltose, cellobiose, cellulose and amylose, Y is H, COOH, OH or $NH_2$ and n is from 3 to 50.

The present invention also provides a process for the preparation of oligomers mentioned above which comprises dissolving polymerizable monomeric NAG in a solvent, adding the chain terminating agent and an initiator, dissolving an accelerator to the solution, allowing the reaction to proceed for a period of 24 hrs to 48 hrs., bringing the solution temperature to 50 to 60° C., precipitating using a non solvent, to obtain said oligomer.

In one of the embodiment of the present invention oligomer may contain Acryloyl NAG or Methacryloyl NAG.

In another embodiment of the present invention the solvent used to dissolve the monomeric ligand may water, methanol, ethanol, di methyl formamide, tetra hydro furan or di methyl sulfoxide.

In still another embodiment of the present invention the chain transfer agent may be from Mercapto Ethanol, Mercapto Propionic Acid, Mercapto Amine, Mercapto Propanol.

In still another embodiment of the present invention the initiator used may be from Ammonium Per Sulphate (APS), Potassium Per Sulphate (KPS), or Azobis Iso Butyro Nitril (AIliN), 4, 4 Azobis (4-Cyanopentanol), 4,4 Azobis (4-Cyanovaleric acid), or 3,3 Azobis (3-Cyanovaleric Acid).

In yet another embodiment of the present invention the accelerator used may be N,N,N',N" Tetramethyl Ethylene Diamine (TEMED).

In yet another embodiment of the present invention the carbohydrates used may be NAG, sialic acid, mannose galactose, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose.

In yet another embodiment of the present invention the non solvent used to precipitate the oligomer may be from acetone, diethyl ether or hexane.

In yet another embodiment of the present invention the molecular weight of oligomer may range from 400 Daltons to 4000 Daltons.

In yet another embodiment of the present invention the oligomers containing ligand may be synthesized by a well-known art in the field, free radical polymerization.

In yet another embodiment of the present invention the oligomers containing ligand may be useful for applications in medicine and biotechnology.

In yet another embodiment of the present invention provide more stable oligomers for the interactions with biomolecules than the natural polymers such as chitin and chitosan containing N-Acetyl Glucosamine.

In yet another embodiment the molar ratio of chain terminating agent to polymerizable monomeric NAG for the preparation of oligomer can be from 1:5 to 1:50 more preferably 0.5 to 25.

In yet another feature of the present invention oligomers containing ligands reported here can bind simultaneously on to the multiple sites of the enzyme/disease causing virus thereby enhancing the inhibitory effect.

In yet another feature of the present invention polyvalent oligomers containing ligands reported herein are effective at very low concentration, which is advantage when the ligand under consideration are expensive e.g. sialic acid.

In yet another feature of the present invention polyvalent oligomers containing ligands containing NAG are stable, water soluble, resistant to degradation, and free from microbial contamination which is an advantage over the natural polymers such as chitin and chitosan.

It is also expected that the presence of multiple ligands in the polymer backbone will enhance binding to the virus and biomolecules such as influenza virus, rotavirus, wheat germ agglutinin. The oligomers containing multiple ligands can potentially interact with multiple receptors simultaneously thereby enhancing the binding to lysozyme.

In yet another feature the relative inhibition may be expressed in terms of $I_{50}$ mM and I max mM values.

In yet another feature the binding ($K_b$) between lysozyme and polyvalent oligomer containing NAG is estimated using a fluorescence method.

Previous methods of synthesis of oligomers and polymers are complicated and need higher inhibition concentrations. It is reported that the polymeric fucosides are resistant to neuraminidase enzyme present on the surface of influenza virus. The viruses also cleave sialic acid groups from molecules that bind to the surface of the virus, and thereby destroy the binding ability.

The oligomers reported by us are effective at very low concentration, which is a significant advantage when the ligands under consideration are expensive e.g. sialic acid. Further, these oligomers can be coupled with other polymers to provide block copolymers. Moreover, the process reported here for the incorporation of ligand into oligomers is relatively simple and involves lesser steps.

The ability of oligomers to bind virus and biomolecules provides a mean of developing new therapeutical agents. These oligomers can be used in various applications such as affinity separations and immunoassays.

The oligomers of the present invention are of suitable molecular weights, which can efficiently bind to the target site.

The ligands on the oligomer have ability to bind to various substrate molecules simultaneously. It is expected that the presence of multiple ligands in the backbone can enhance binding to the viruses and biomolecules. Thus the oligomers containing multiple ligands at low concentrations are utilized and can potentially interact with multiple receptors thereby enhancing the inhibition.

The process for the preparation of the oligomer containing NAG is illustrated herein below with reference to examples which are illustrative only and should not be considered to limit the scope of the present invention in any manner.

EXAMPLE 1

This example describes the process for the preparation of homopolymers of Acryloyl N-Acetyl Glucosamine (P.Ac-.NAG)

0.00727 M of Acryloyl-N Acetyl Glucosamine (Ac. NAG) was dissolved in 25 ml distilled water in a round bottom flask and stirred continuously to obtain a clear 12 solution, 4 mg. Ammonium per sulphate as initiator and TEMED (1%) as an accelerator were added to the reaction mixture. The reaction was carried out at 60 0 c. for 24 hrs, under continuous nitrogen purging. The solution was concentrated and precipitated in acetone, reprecipitated in acetone to eliminate unreacted monomers and dried under vacuum. Oligomers of various molecular weights were then synthesized.

Molecular wts. were measured using Vapor Pressure Osmometer were in the range of 600–25,000 daltons.

EXAMPLE 2

This example describes the process for the preparation of functional oligomers of AcryloylN-Acetyl Glucosamine with Mercapto Ethanol (P. Ac. NAG.ME)

0.00727 M of Acryloyl-N acetyl Glucosamine (Ac. NAG) was dissolved in 25 ml distilled water in a round bottom flask and stirred continuously to obtain a clear solution. 0.0002908 M of Mecapto Ethanol was added as a chain transfer agent. Ammonium per sulphate as initiator and TEMED as an accelerator were added to the reaction mixture. The reaction was carried out at 60° C. for 24 hrs. under continuous nitrogen purging. The solution was precipitated in acetone, reprecipitated in acetone to eliminate unreacted monomers and dried under vacuum. Polymers of various molecular weights were then synthesized using varying ratios of initiator and chain transfer agents.

The data in Table: 1 show that the hydroxyl terminated oligomers of P, Ac, NAG, ME synthesized consists of molecular weights as determined by Vapor Phasee Osmometer (VPO) range from 400 to 2808.

EXAMPLE 3

This example describes the process for the preparation of oligomers of Methacryloyl N-Acetyl Glucosamine (P.M.Ac-.NAG)

0.007 M of Methacryloyl-N Acetyl Glucosamine was dissolved in 25 ml distilled water in a round bottom flask and stirred continuously to obtain a clear solution, 0.0002 M of Mecaptoethanol was added as a chain transfer agent. Ammonium per sulphate as initiator and TEMED as an accelerator were added to the reaction mixture. The reaction was carried out at 60 0 C. for 24 hrs. under continuous nitrogen purging. The solution was concentrated and precipitated in acetone, reprecipitated in acetone to eliminate unreacted monomers and dried under vacuum. Methacryloyl NAG polymers of various molecular weights were synthesized using varying ratios of initiator and chain transfer agents.

Molecular weights for oligomers containing OH terminal poly Methacryloyl N Acetyl Glucosamine are from 1125 to 3900. (Table: 2).

EXAMPLE 4

This example describes the process for the preparation of difunctional polymers of Acryloyl N-Acetyl Glucosamine (Ac. NAG) of varying mol. wts.

0.007 M of Acryloyl-N Acetyl Glucosamine (Ac. NAG) was dissolved in 25 ml distilled water in a round bottom flask and stirred continuously to obtain a clear solution, 4 mg of 3;3 Azobis (3-Cyanovaleric Acid) was added as a jnitiator. The reaction was carried out at 60° C. for 24 hrs. under continuous nitrogen purging. The solution was concentrated and precipitated in acetone, reprecipitated in acetone to eliminate unreacted\monomers and dried under vacuum.

EXAMPLE 5

This example describes estimation of binding constant (Kb) of functional polymers containing NAG by fluorescence spectroscopic method (Chipman et al, J. Biol. Chem. 242-19, 4388–4394, 1967).

Fluorescence spectra of lysozyme were recorded on a Perkin Elmer LS-50 B luminescence spectrophotometer, excitation frequency was 285 nm. Solutions of lysozyme and N-Acetyl Glucosamine were prepared in 0.066 M phosphate buffer pH 6.2, containing 0.0154 M sodium chloride & 0.008 M solution azide, 0.1 milliliter of lysozyme 80 μg/ml was mixed with solution containing different ligand concentration in a 2 ml capacity 10 mm square quartz cells maintained at 18° C.

Phosphate buffer was added to make the volume to 2 mi. The fluorescence intensities of solution relative to the reference solution containing only enzyme and buffer were also measured. The relative fluorescence intensity of lysozyme saturated with solution containing different ligand concentration, Foe, was extrapolated from the experimental values by plotting 1/(Fo–F) against 1/[S] where F is the measured fluorescence of a solution containing enzyme with given substrate concentration [S] and Fo is the fluorescence of a solution containing enzyme alone. The highest concentration of oligomeric substrates was used when enzyme was saturated more than 85%.

TABLE 1

Lysozyme binding by oligomers of Acryloyl N-Acetyl Glucosamine bearing terminal OR group

|  | Mol. Wt. VPO | $K_b$ |
| --- | --- | --- |
| NAG | 221 | $5.24 \times 10^2$ |
| Ac.NAG | 275 | $7.07 \times 10^4$ |
| PAc. NAG.OR | 638 | $5.3 \times 10^5$ |
| PAc. NAG.OR | 1315 | $2.51 \times 10^5$ |
| PAc. NAG.OR | 2631 | $4.4 \times 10^5$ |
| PAc. NAG.OR | 2808 | $4.8 \times 10^5$ |

Molecular weights for hydroxyl polyvalent oligomer containing Acryloyl NAG in range from 400 to 2808 (Table 1).

The binding constant for hydroxyl terminated polyvalent oligomer containing Acryloyl NAG of molecular weight 638 is $5.3 \times 10^5$, which shows almost 1000 folds enhancement over NAG ($5.24 \times 10^2$). The binding constants for other polymer in Table 1 are also comparable. Molecular weights for polyvalent oligomer containing Methacryloyl NAG are in range 1125 to 3900 (Table 2) represents the binding constants. Methacryloyl NAG which are again comparable to these reported in Table 1.

TABLE 2

Lysozyme binding by oligomers of Methacryloyl N-Acetyl Glucosamine containing terminal OR group

|  | Mol. Wt. VPO | Kb |
| --- | --- | --- |
| M.Ac. NAG | 289 | $6.9 \times 10^4$ |
| P. M.Ac. NAG.OR | 1125 | $1.0 \times 10^5$ |
| P. M.Ac. NAG.OR | 1600 | $3.9 \times 10^5$ |
| P. M.Ac. NAG.OR | 2857 | $6.3 \times 10^5$ |

EXAMPLE 6

This example describes estimation of relative inhibition of lysozyme by polyvalent oligomer containing NAG 1.5% w/v stock solutions of oligomer containing NAG was prepared in 0.0066 M phosphate buffer pH 6.2 containing 0.0154 m sodium chloride and 0.008 M sodium azide. One milliliter of stock solution containing different ligand concentration was mixed with 1.6 ml of 78 μg 1 ml of *Micrococcus lysodeikticus* in a 3-ml capacity lass cuvette. The mixture was incubated for 5 minutes at 20° C. To this mixture 0.1 ml of lysozyme (27 μg 1 ml) was added and mixed thoroughly. The absorbance at 450 nm (Δ450) was recorded for 30 seconds. A blank reading without the polymer ligand was noted and the change in the absorbance per second was calculated.

TABLE 3

Lysozyme inhibition by oligomers of Acryloyl N-Acetyl Glucosamine containing OH group

|  | Mol. Wt. | $I_{50}$ mM | $I_{max}$ | $I_{max}$ mM' |
|---|---|---|---|---|
| NAG | 221 | 74.00 | 55.29 | 92.50 |
| Ac.NAG | 275 | 14.81 | 50.00 | 14.81 |
| PAc.NAG.OH | 638 | 0.0026 | 89.30 | 0.0043 |
| PAc.NAG.OH | 1315 | 0.0016 | 73.43 | 0.0042 |
| PAc.NAG.OH | 2631 | 0.0014 | 73.00 | 0.0021 |
| PAc.NAG.OH | 2808 | 0.0029 | 69.08 | 0.0037 |

The oligomer having molecular weight 638 has I 50 value 0.0026 mM which is more than 28,000 folds lower than NAG 74.00 mM indicating enhanced inhibition efficacy, (Table 3) and yet I max has increased from 55.29 to 89.30.

TABLE 4

Lysozyme inhibition by oligomers of Methacryloyl N-Acetyl Glucosamine Containing OH Group

|  | Mol, Wt. VPO | $I_{50}$ mM | $I_{max}$ | $I_{max}$ mM |
|---|---|---|---|---|
| M.Ac. NAG | 289 | 18.10 | 71.89 | 21.2 |
| P.M.Ac.NAG.OH | 1125 | 0.0037 | 62 | 0.0042 |
| P.M.Ac.NAG.OH | 1600 | 0.0020 | 80.95 | 0.0031 |
| P.M.Ac.NAG.OH | 2857 | 0.0013 | 85.23 | 0.0017 |

The oligomer having molecular weight 2857 has I 50 value 0.0013 mM which is more than 56,000 folds lower than NAG 74.00 mM indicating enhanced inhibition efficacy, (Table 4) and yet I max has increased from 55.29 to 83.23.

What is claimed is:

1. A functional polyvalent oligomer having Formula (1)

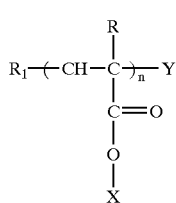

Formula (1)

wherein R is H, $CH_3$, or $C_2H_5$, $R_1$ is H, $NH_2$, OH, or COOH, X is N-Acetyl Glucosamine, Y is H, COOH, OH or $NH_2$, and n is from 3 to 50.

2. A process for the preparation of the functional polyvalent oligomer of Formula (1)

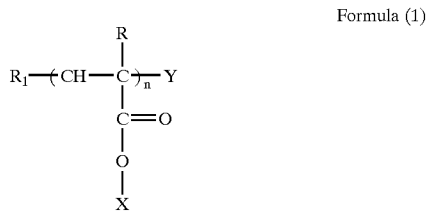

Formula (1)

wherein R is H, $CH_3$, or $C_2H_5$, $R_1$ is H, $NH_2$, OH, or COOH, X is N-Acetyl Glucosamine, Y is H, COOH, OH or $NH_2$, and n is from 3 to 50; which comprises dissolving a polymerizable monomer in a solvent and adding a chain transfer agent, adding an initiator and accelerator to the solution, allowing a reaction for a period of 24 hrs to 48 hrs to form a reaction mixture, bringing the temperature of the reaction mixture to 50 to 60° C., precipitating a product from the reaction mixture using a non solvent, vacuum drying the product for a time sufficient to obtain said functional polyvalent oligomer.

3. A process as claimed in claim 2, wherein the monomer is Acryloyl N-Acetyl Glucosamine or Methacryloyl N-Acetyl Glucosamine.

4. A process as claimed in claim 3, wherein said monomer is Acryloyl NAG having the formula 2

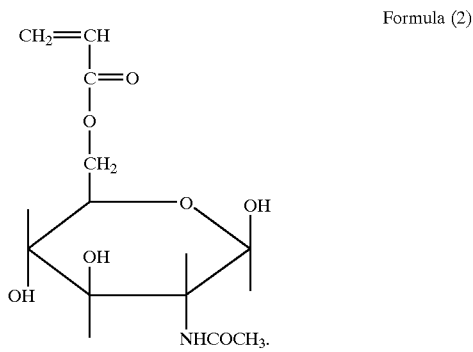

Formula (2)

5. A process as claimed in claims 4, wherein said chain transfer agent is a mercapto ethanol having the formula 3:

Formula 3

6. A process as claimed in claim 2, wherein the solvent used to dissolve the polymerizable monomer is selected from the group consisting of water, methanol, ethanol, dimethyl formamide, tetra hydro furan and dimethyl sulfoxide.

7. A process as claimed in claim 2, wherein the chain transfer agent is selected from the group consisting of Mercapto Ethanol, Mercapto Propionic Acid, Mercapto Amine, and Mercapto Propanol.

8. A process as claimed in claim 2, wherein said initiator is selected from the group consisting of ammonium per sulphate (APS), potassium per sulphate (KPS), azo bis iso butyro nitrile (AffiN), 4,4 azobis (4-cyanopentanol), 4,4 azobis (4-cyanovaleric acid), and 3,3 azobis (3-cyanovaleric acid).

9. A process as claimed in claim 2, wherein said accelerator is N,N',N"tetramethyl ethylene diamine (TEMED).

10. A process as claimed in claim 2, wherein said non solvent is acetone, diethyl ether or hexane.

11. A process as claimed in claim 2, wherein the molecular weight of said polyvalent oligomer is in a range from 400 Daltons to 4000 Daltons.

12. A process as claimed in claim 2, wherein the molar ratio of said chain transfer agent to said polymerizable monomer for the synthesis of the functional polyvalent oligomer is in the range of from 0.5:25 to 1:0.5.

13. A process as claimed in claim 2, wherein the molar ratio of said chain transfer agent to said polymerizable monomer for the synthesis of the functional polyvalent oligomer is in the range of from 1 to 25 to 1:20.

* * * * *